US012647730B2

(12) United States Patent
Holt et al.

(10) Patent No.: US 12,647,730 B2
(45) Date of Patent: Jun. 2, 2026

(54) VIBRATION MODULE, SPEAKER HAVING THE SAME, AND MANUFACTURING METHOD THEREOF

(71) Applicant: Tymphany HK Limited, Hong Kong (HK)

(72) Inventors: Andrew Trippier Holt, Taipei City (TW); Wen-Hong Wang, Taipei City (TW); Chia-Chien Chen, Taipei City (TW); Yi-Hui Hsiao, Taipei City (TW); Chih-Ming Fan, Taipei City (TW)

(73) Assignee: TYMPHANY HK LIMITED, Hong Kong (HK)

( * ) Notice: Subject to any disclaimer, the term of this patent is extended or adjusted under 35 U.S.C. 154(b) by 161 days.

(21) Appl. No.: 18/400,455

(22) Filed: Dec. 29, 2023

(65) Prior Publication Data

US 2024/0223954 A1 Jul. 4, 2024

Related U.S. Application Data

(60) Provisional application No. 63/452,747, filed on Mar. 17, 2023, provisional application No. 63/436,210, filed on Dec. 30, 2022.

(51) Int. Cl.

| | |
|---|---|
| ***H04R 7/18*** | (2006.01) |
| ***H04R 7/12*** | (2006.01) |
| ***H04R 7/26*** | (2006.01) |
| ***H04R 31/00*** | (2006.01) |

(52) U.S. Cl.

CPC ................. *H04R 7/26* (2013.01); *H04R 7/12* (2013.01); *H04R 7/18* (2013.01); *H04R 31/003* (2013.01); *H04R 2400/11* (2013.01)

(58) Field of Classification Search

CPC ... H04R 7/16; H04R 7/18; H04R 7/20; H04R 7/26; H04R 2231/001; H04R 2307/201

USPC .......................................................... 381/413

See application file for complete search history.

(56) References Cited

U.S. PATENT DOCUMENTS

| | | | | | |
|---|---|---|---|---|---|
| 2002/0170773 | A1* | 11/2002 | Stead | G10K 13/00 | 181/171 |
| 2004/0007420 | A1* | 1/2004 | Takahashi | H04R 7/20 | 181/173 |
| 2008/0002850 | A1* | 1/2008 | Watanabe | H04R 7/127 | 381/412 |
| 2008/0025552 | A1* | 1/2008 | Dohi | H04R 9/025 | 381/421 |
| 2023/0007402 | A1* | 1/2023 | Liu | H04R 9/043 | |

* cited by examiner

*Primary Examiner* — Katherine A Faley

(74) *Attorney, Agent, or Firm* — MUNCY, GEISSLER, OLDS & LOWE, P.C.

(57) ABSTRACT

A vibration module, a speaker having the same and a manufacturing method thereof are disclosed. The vibration module includes a surround and a diaphragm. The surround includes an annular convex section, a first annular portion and a second annular portion. The annular convex section is connected to the diaphragm to provide damping effect. The first annular portion is connected to the annular convex section having a protrusion opposite to the annular convex section. The second annular portion is connected to the first annular portion to serve as a rim of the surround.

13 Claims, 6 Drawing Sheets

VIBRATION MODULE, SPEAKER HAVING THE SAME, AND MANUFACTURING METHOD THEREOF

CROSS-REFERENCE TO RELATED APPLICATIONS

This application claims priority of U.S. Provisional Application No. 63/436,210 filed on Dec. 30, 2022 and U.S. Provisional Application No. 63/452,747 filed on Mar. 17, 2023 under 35 USC § 119(e), the entire contents of which are hereby incorporated by reference.

BACKGROUND

Field of the Invention

The invention relates to an acoustic device, and more particularly to a vibration module including a surround and a surround frame having unique features, to a speaker having the vibration module, and to a manufacturing method of the vibration module.

Description of the Related Art

A surround configured to connect a diaphragm and a basket provides damping effect during vibration of the diaphragm which is made by plastic material. As the surround is usually made by elastic material, such as plastic, foam or fiber textile, it is difficult for assembly of the surround to be implemented in a plane, and the edge shape of the surround is often varied when it is bonded to the basket.

Referring to FIG. 1, a surround 2 is formed by plastic injection molding process. As a boundary surface S of the basket 6 extends through the lowest position of an annular convex section 20 of the surround 2, so the molten plastic may overflow from the boundary surface S. The molten plastic may overflow at the lowest position of an annular convex section 20. This causes stiffness variation of the annular convex section 20 of the surround 2 so that the surround 2 cannot provide appropriate damping effect for the diaphragm 3. Therefore, the material overflow problem caused by the boundary surface S of the basket 6 being located at the lowest position of an annular convex section 20 should be solved.

BRIEF SUMMARY OF THE INVENTION

An object of the disclosure is to provides a vibration module solving the plastic material overflow problem at the lowest position of an annular convex section occurring in the prior art.

An exemplary embodiment of the vibration module of the disclosure includes a surround and a diaphragm. The surround includes an annular convex section, a first annular portion and a second annular portion. The annular convex section is connected to the diaphragm to provide damping effect. The first annular portion is connected to the annular convex section having a protrusion opposite to the annular convex section. The second annular portion is connected to the first annular portion to serve as a rim of the surround.

In another exemplary embodiment, the second annular portion has a thickness greater than that of the first annular portion.

In yet another exemplary embodiment, the surround further includes a plurality of ribs disposed on the annular convex section and surrounding an axis thereof.

In yet another exemplary embodiment, each of the ribs extends slantly with respect to a line radially intersecting the axis.

In yet another exemplary embodiment, the surround further includes an annular rib disposed on the annular convex section and surrounding an axis thereof.

In yet another exemplary embodiment, the annular rib includes a plurality of sine wave portions connected to each other to surround the axis.

In yet another exemplary embodiment, the vibration module further includes a surround frame configured to support the surround, wherein the surround frame includes: a first annular boundary surface disposed under the annular convex section and distanced from the annular convex section; and an inner annular surface disposed under the annular convex section and distanced from the annular convex section, wherein the first annular boundary surface intersects the inner annular surface.

In yet another exemplary embodiment, the surround frame further includes a first annular stepped structure engaged with the first annular portion.

In yet another exemplary embodiment, the surround frame further includes a second annular stepped structure engaged with the second annular portion.

In yet another exemplary embodiment, the surround further includes at least one first engaging portion, and the surround frame further includes at least one second engaging portion engaged with the first engaging portion.

In yet another exemplary embodiment, the surround further includes a depressed groove formed between the first annular portion and the annular convex section.

The disclosure provides another exemplary embodiment of a vibration module including a surround and a surround frame. The surround includes an annular convex section. The surround frame is configured to support the surround and includes first annular boundary surface disposed under the annular convex section and distanced from the annular convex section; and an inner annular surface disposed under the annular convex section and distanced from the annular convex section, wherein the first annular boundary surface intersects the inner annular surface.

In another exemplary embodiment, the surround includes a first annular portion connected to the annular convex section, and a second annular portion connected to the first annular portion, wherein the first annular portion including a protrusion opposite to the annular convex section, and the second annular portion is configured to serve as a rim of the surround.

In yet another exemplary embodiment, the vibration module further includes a first annular stepped structure and a second stepped structure, wherein the first annular stepped structure includes the first annular boundary surface and a second annular boundary surface extending upwards from an outer end of the first annular boundary surface, the first annular portion is engaged with the first annular stepped structure, the second stepped structure is connected to a top end of the second annular boundary surface, and the second annular portion is engaged with the second stepped structure.

In yet another exemplary embodiment, an inner end of the first annular boundary surface is connected to a top end of the inner annular surface, and the first annular boundary surface extends outwards from the top end of the inner annular surface.

In yet another exemplary embodiment, the second stepped structure further includes a third annular boundary surface, an inner end of the third annular boundary surface is connected to a top end of the second annular boundary surface, and the third annular boundary surface extends outwards from the top end of the second annular boundary surface.

In yet another exemplary embodiment, the first annular boundary surface and the third annular boundary surface are parallel with a radial direction of the surround frame.

In yet another exemplary embodiment, the second stepped structure further includes a fourth annular boundary surface extends upwards from an outer end of the third annular boundary surface.

In yet another exemplary embodiment, the vibration module further includes an annular groove surrounding an axis of the surround frame, wherein the first annular boundary surface extends from a top end of the inner annular surface.

In yet another exemplary embodiment, the annular groove is depressed from the first annular boundary surface.

The disclosure provides a speaker including the aforementioned vibration module.

The disclosure provides a manufacturing method of a vibration module including the following steps: providing a diaphragm and an annular structure; forming a surround between the diaphragm and the annular structure to join the diaphragm and the annular structure; and accomplishing assembly of the vibration module.

In another exemplary embodiment, the surround is formed by a plastic injection process.

In yet another exemplary embodiment, the surround includes a protrusion.

The disclosure has the following advantageous effects: the annular convex section is connected to the diaphragm to provide damping effect for the diaphragm; the first annular portion is connected to annular convex portion and have a protrusion opposite to the annular convex section, whereby molten plastic material for formation of the surround may merely flow over the lowest position of the protrusion rather than flow over the lowest position of the annular convex section, which reduces the stiffness variation of the annular convex section due to the overflow of the molten plastic material.

The vibration module of the disclosure has a higher yield and generates less scraps due to reduction of the overflow of the molten plastic material in the process. Furthermore, as the surround is formed by plastic injection molding process, no adhesive is needed, which follows environmentally friendly concept and sustainable development.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
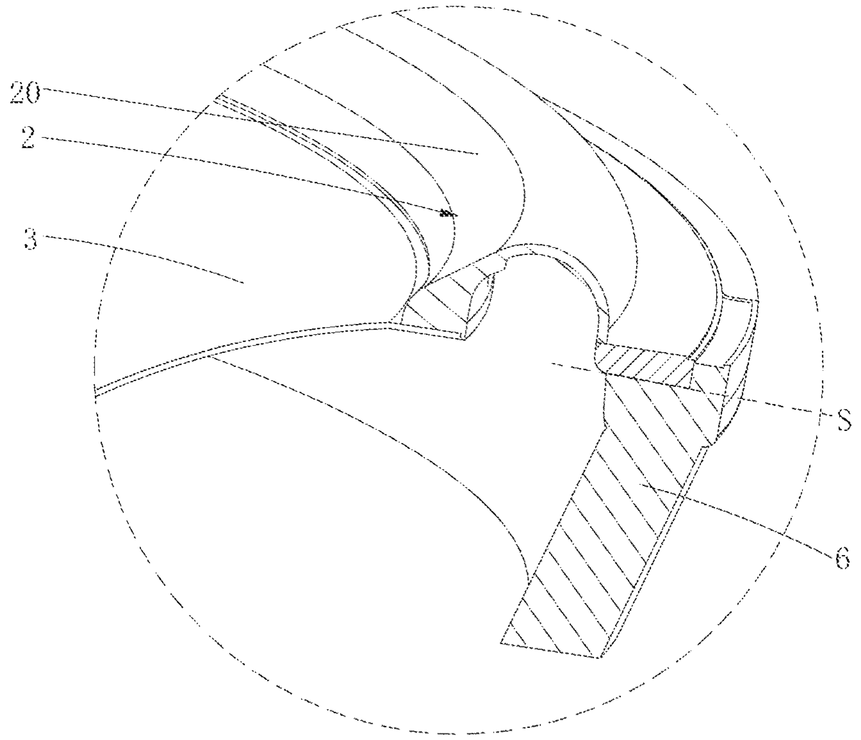
FIG.1 (PRIOR ART)
FIG. 1 is a partially enlarged view of a cross section of a conventional vibration module.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

In order to solve the problems of difficult assembly and time-consuming manufacturing process of speaker transducers in the prior art, the present application provides a transducer and a manufacturing method thereof, which are now described in detail through the following embodiments and in conjunction with the accompanying drawings. Reference in this application to "an embodiment" means that a particular feature, structure or characteristic described in connection with the embodiment may be included in at least one embodiment of the application. The appearances of the phrase "embodiment" in various places in the specification are not necessarily all referring to the same embodiment, nor are separate or alternative embodiments mutually exclusive with other embodiments. It will be understood by those skilled in the art that the embodiments described herein may be combined with other embodiments.

The terminology used in this application is only for the purpose of describing particular embodiments, and is not intended to limit this application. The singular forms "a". "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for case of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

In the description of this disclosure, it should be noted that, unless otherwise clearly stated and limited, the terms “installation”, “connection” and “engagement” should be understood in a broad meaning. For example, “connection” or “engagement” of a mechanical structure may refer to a physical connection. For example, the physical connection may be a fixed connection, such as a fixed connection through a fastener, such as a fixed connection through screws, bolts or other fasteners. The physical connection may also be a detachable connection, such as mutually engaging connection. The physical connection can also be an integral connection; for example, welding, bonding or integrally forming a connection.

First Embodiment

For the sake of clear description, an orthogonal coordinate system O—XYZ has been established. The Z axis of the orthogonal coordinate system is coincident with a central axis of a surround frame 1, and the X axis and the Y axis of the orthogonal coordinate system are parallel with radial directions of the surround frame 1. The positive direction of the X axis, the Y axis and the Z axis are identical in all drawings of the disclosure.

Figure 2:
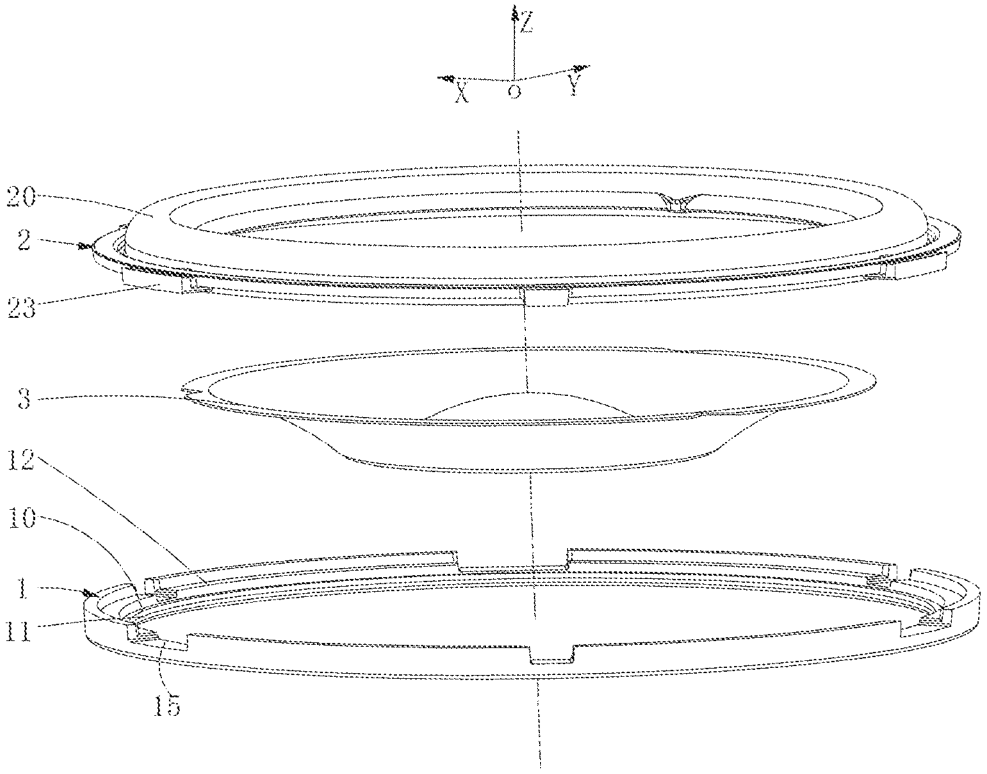
FIG. 2 is an exploded view of a first embodiment of a vibration module of the disclosure.
Figure 3:
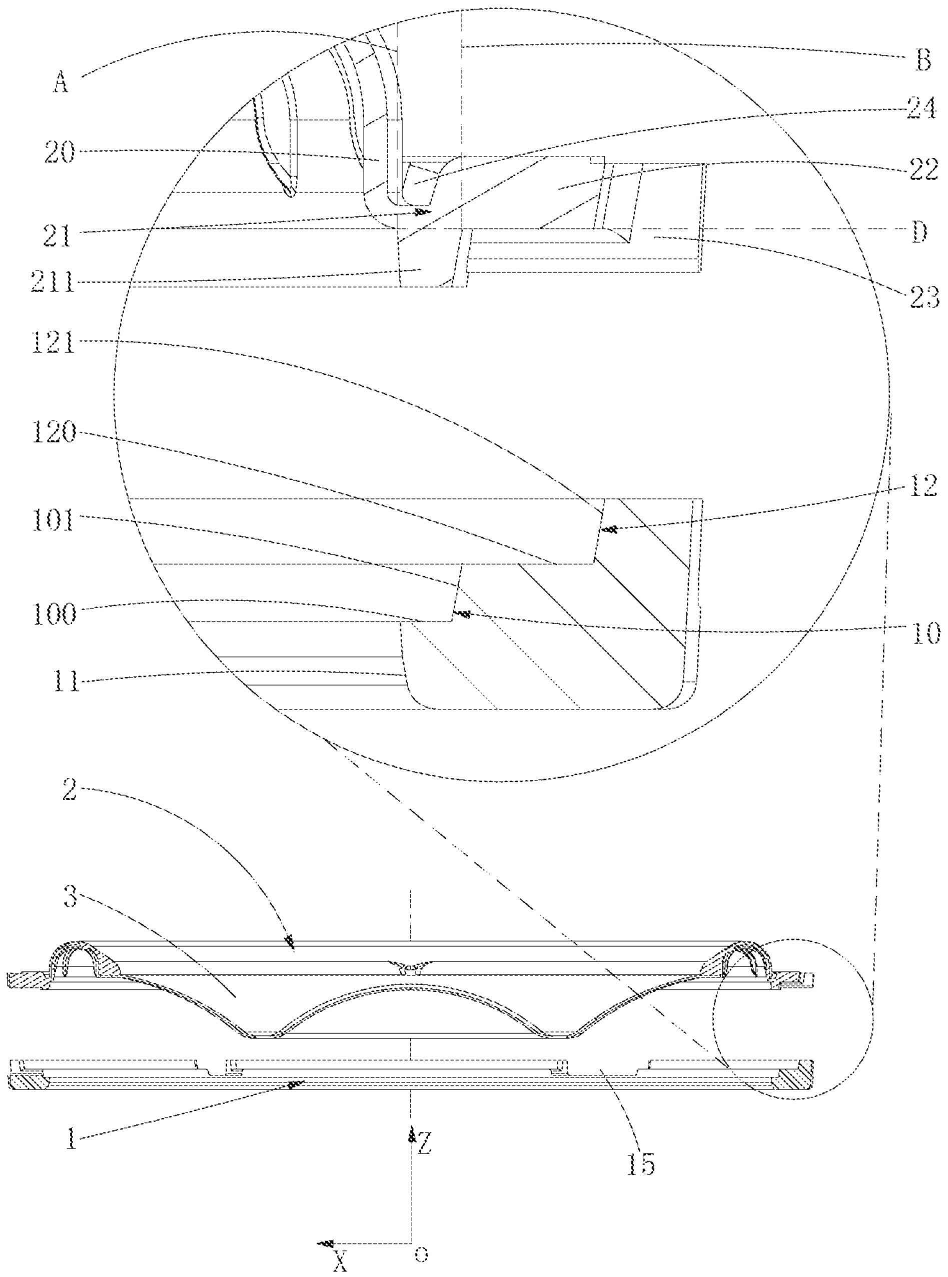
FIG. 3 is an exploded view of a cross section of the first embodiment of the vibration module of the disclosure and an enlarged view of a portion of the cross section.

Referring to FIGS. 2 and 3, a speaker is provided in this embodiment. The speaker includes a vibration module, and the vibration module includes a surround 2 and a diaphragm 3. The surround 2 includes an annular convex section 20, a first annular portion 21 and a second annular portion 22. The annular convex section 20 is connected to the diaphragm 3 to provide damping effect for the diaphragm 3. The first annular portion 21 has a protrusion 211 opposite to the annular convex section 20. The second annular portion 22 is connected to the first annular portion 21 to serve as a rim of the surround 2. Alternatively, a groove 24 is formed at the connection position of the first annular portion 21 and the annular convex section 20. In other words, the groove 24 is formed between the first annular portion 21 and the annular convex section 20. In other embodiments, no groove may be formed between the first annular portion 21 and the annular convex section 20.

Referring to FIGS. 2 and 3, supposed that a cylindrical surface A is located at the lowest position and parallel with the Z axis, then the annular convex section 20 is located at an inner side of the cylindrical surface A (the annular convex section 20 is at left side of the cylindrical surface A of FIG. 3). Supposed that a cylindrical surface B is located at an outer side of the first annular portion 21, then the portion of the surround 2 between the cylindrical surface A and the cylindrical surface B is the first annular portion 21, and the portion outsides the cylindrical surface B is the second annular portion 22. Supposed that a plane D extends through the lowest position of the annular convex section 20 and parallel with a plane XOY, the protrusion 211 can be an annular body of the first annular portion 21 beneath the plane D, and therefore under the annular convex section 20. As shown in FIG. 3, the protrusion 211 is located under an outer side of the annular convex section 20.

Referring to FIGS. 2 and 3, a surround frame 1 is provided to support the surround 2. The surround frame 1 includes a first annular boundary surface 100 and an inner annular surface 11. The first annular boundary surface 100 is disposed under the annular convex section 20 and distanced from the annular convex section 20. The inner annular surface 11 is located under the annular convex section 20 and distanced from the annular convex section 20. The first annular boundary surface 100 intersects the inner annular surface 11.

Referring to FIGS. 2 and 3, the surround 2 is annular, and the annular convex section 20 is annular and has a cross section of arced shape. Because the annular convex section 20 is configured to provide damping effect for the diaphragm 3, the connection of the annular convex section 20 and the first annular portion 21 should not have a varied shape caused by overflow of molten material during an injection molding process and affecting the damping effect provided by the annular convex section 20. The annular convex section 20 protrudes upwards, and is located at the inner side of the cylindrical surface A (the left side of the cylindrical surface A of FIG. 3).

As shown in FIG. 3, the first annular boundary surface 100 can be an annular plane parallel with the plane XOY. The inner annular surface 11 is inclined with respect to the Z axis, and the intersection angle of the inner annular surface 11 and the first annular boundary surface 100 ranges between 0° and 180°. For example, the intersection angle of the inner annular surface 11 and the first annular boundary surface 100 is 90°. The surround 2, the first annular boundary surface 100 and the inner annular surface 11 are coaxial with the surround frame 1.

As shown in FIG. 3, alternatively, the surround frame 1 includes a first annular stepped structure 10 surrounding the central axis of the surround frame 1. The first annular boundary surface 100 is disposed at the lowest position of the first annular stepped structure 10. The first annular stepped structure 10 is coaxial with the Z axis. The first annular stepped structure 10 increases contact area of the surround 2 and the surround frame 1, whereby the surround 2 is secured to the surround frame 1 more stably.

As shown in FIG. 3, alternatively, the first annular stepped structure 10 further includes a second annular boundary surface 101 extending upwards from an outer end of the first annular boundary surface 100. The second annular boundary surface 101 is inclined or orthogonal with the first annular boundary surface 100. That is the second annular boundary surface 101 extends upwards in a manner that the second annular boundary surface 101 is inclined or orthogonal with the first annular boundary surface 100, and the lowest position of the second annular boundary surface 101 is connected to the outer end of the first annular boundary surface 100, whereby the first annular stepped structure 10 constituted by the first annular boundary surface 100 and the second annular boundary surface 101 is depressed along a direction away from the Z axis so as to provide an space accommodating the molten plastic material for forming the surround 2. Such a structure reduces the possibility of overflow of the molten plastic material for forming the surround 2.

As shown in FIG. 3, alternatively, the surround frame 1 includes a second annular stepped structure 12 surrounding the central axis of the surround frame 1 and coaxial with the Z axis. The second annular stepped structure 12 is connected to a top end of the second annular boundary surface 101. A bottom end of the second annular stepped structure 12 can be integrally formed with the top end of the second annular boundary surface 101. The second annular stepped structure 12 increases the contract area of surround 2 and the surround frame 1, whereby the surround 2 is secured to the surround frame 1 more stably.

As shown in FIG. 3, alternatively, the second annular stepped structure 12 further includes a third annular boundary surface 120 disposed at the bottom end thereof. An inner end of the third annular boundary surface 120 is connected to the top end of the second annular boundary surface 101. The inner end of the third annular boundary surface 120 is the end near the Z axis, and the outer end of the third annular boundary surface 120 is the end away from the Z axis. The third annular boundary surface 120 extends outwards from the top end of the second annular boundary surface 101, and therefore away from the Z axis. As the third annular boundary surface 120 extends outwards from the top end of the second annular boundary surface 101, the molded portion of the surround 2 on the third annular boundary surface 120 does not occupy an inner space of the surround frame 1.

As shown in FIG. 3, alternatively, the second annular stepped structure 12 further includes a fourth annular boundary surface 121. The fourth annular boundary surface 121 extends from the outer end of the third annular boundary surface 120 to be inclined or orthogonal with the third annular boundary surface 120. The bottom end of the fourth annular boundary surface 121 is connected to an outer end of the third annular boundary surface 120.

As shown in FIG. 3, the fourth annular boundary surface 121 extends from the outer end of the third annular boundary surface 120, whereby the second annular stepped structure 12 constituted by the fourth annular boundary surface 121 and the third annular boundary surface 120 is depressed along a direction away from the Z axis so as to form another space accommodating the molten plastic material for forming the surround 2. Such a structure reduces the possibility of overflow of the molten plastic material for forming the surround 2. The first annular boundary surface 100, the second annular boundary surface 101, the third annular boundary surface 120 and the fourth annular boundary surface 121 are integrally formed and coaxially disposed. That is the first annular stepped structure 10 and the second annular stepped structure 12 are integrally formed.

Figure 4:
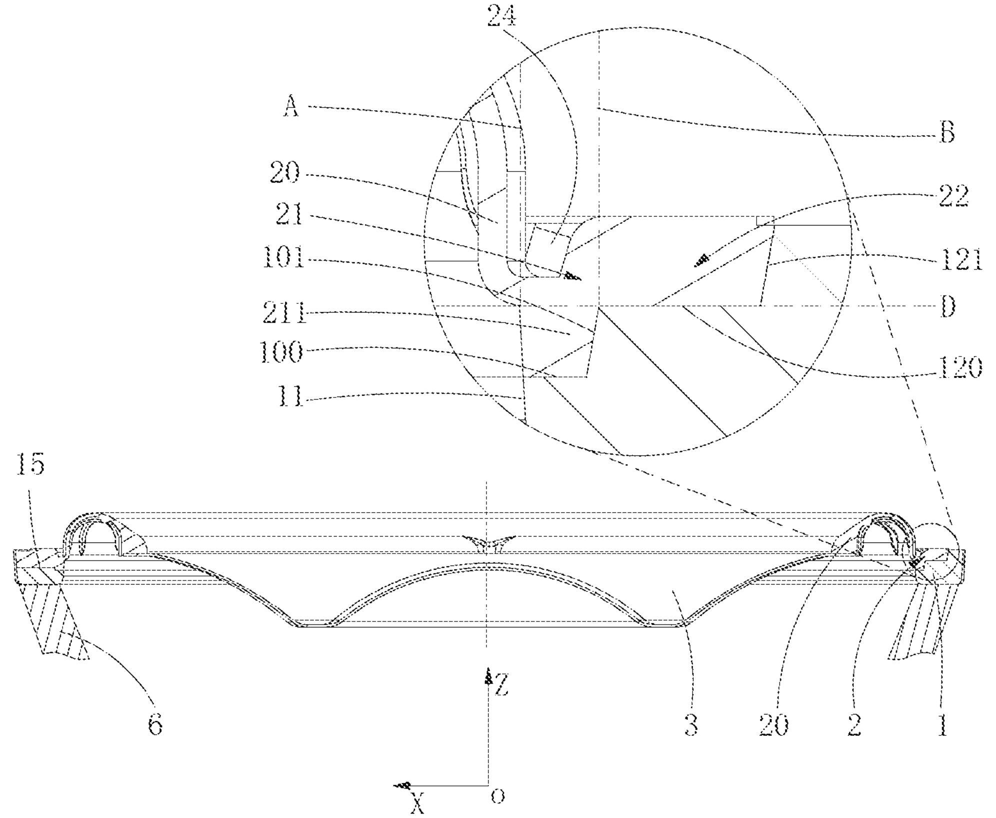
FIG. 4 is a cross section of the first embodiment of the vibration module of the disclosure and an enlarged view of a portion of the cross section.

As shown in FIG. 4, alternatively, the first annular boundary surface 100 and the third annular boundary surface 120 are parallel with each other, and both are also parallel with the radial direction of the surround frame 1 as well as the plane XOY. As the first annular boundary surface 100 is parallel with the radial direction of the surround frame 1, each portion of the first annular boundary surface 100 has an identical distance to the corresponding portion of the bottom end of the annular convex section 2, whereby the first annular portion 21 has a uniform thickness. Similarly, as the third annular boundary surface 120 is parallel with the radial direction of the surround frame 1, the second annular portion 22 has a uniform thickness.

As shown in FIG. 4, the first annular boundary surface 100 and the inner annular surface 11 are integrally formed. The first annular boundary surface 100, the second annular boundary surface 101, the third annular boundary surface 120 and the fourth annular boundary surface 121 are the boundary surfaces of the surround frame 1 supporting the molten plastic material forming the surround 2. As the first annular boundary surface 100 is disposed under the annular convex section 20 and distanced therefrom, the first annular boundary surface 100 is not directly connected to the annular convex section 20 when the surround 2 is molded on the surround frame 1. Similarly, the inner annular surface 11 is not directly connected to the annular convex section 20 when the surround 2 is molded on the surround frame 1.

As shown in FIG. 4, alternatively, the inner end of the first annular boundary surface 100 is connected to the top end of the inner annular surface 11, and the first annular boundary surface 100 extends from the top end of the inner annular surface 11. As the inner end of the first annular boundary surface 100 is the end near the Z axis, and the outer end of the first annular boundary surface 100 is the end away from the Z axis, the first annular boundary surface 100 extends from the top end of the inner annular surface 11, and therefore away from the Z axis, whereby the edge of the surround 2 does not affect propagation of the acoustic waves generated by the diaphragm 3.

As shown in FIG. 4, since the first annular portion 21 is connected to the annular convex section 20 and has a protrusion 211 opposite to the annular convex section 20, the molten plastic material may overflow at a position lower than the annular convex section 20 rather than overflow at the lowest end of the annular convex section 20 during the injection molding process, whereby the variation of the stiffness of the edge of the surround 2 caused by the overflow of the molten plastic material is reduced. The first annular boundary surface 100 disposed under and distanced from the annular convex section 20 increases the thickness of the edge of the surround 2, thereby increasing the space to allow larger vibration of the surround 2 and therefore increasing the damping force against the vibration.

Figure 5:
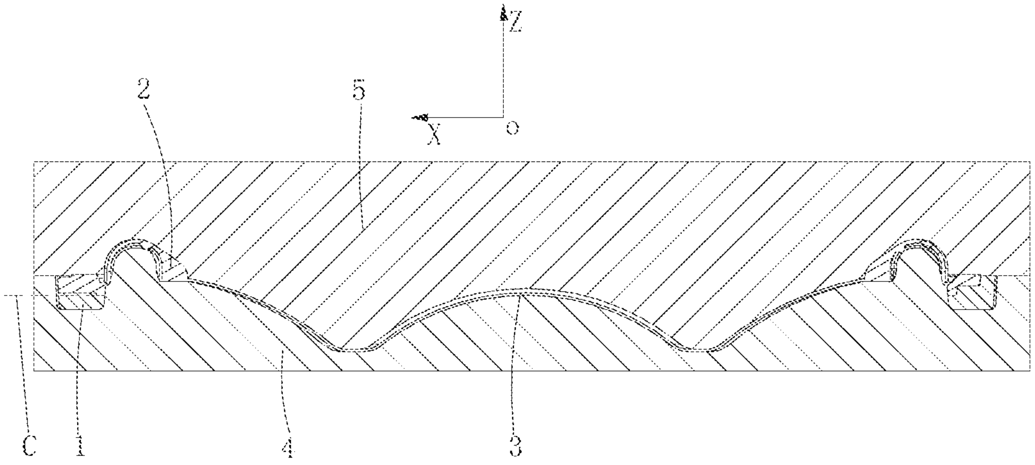
FIG. 5 is a cross section of a mold for a surround of the first embodiment of the vibration module formed on a surround frame and a diaphragm.

As shown in FIG. 5, during the manufacture process of the surround 2, the diaphragm 3 and the surround frame 1 can be manufactured in advance and placed in the lower mold 4. The upper mold 5 is combined with the lower mold 4 to form a mold cavity for the formation of the surround 2. The molten plastic material is injected into the mold cavity to form the surround 2, which is secured to the diaphragm 3 and the surround frame 1 after the molding. The diaphragm 3 can be made of glass fiber or polycarbonate or the combination of them. Alternatively, we may use various materials to make the diaphragm 3, e.g. woven fibre or amorphous fibre or other sheet material or plastic with suitable blend or TPU. The surround frame 1 can be made of polycarbonate. Alternatively, we may use general engineering plastic to make the surround frame 1, and it could be other than PC and may well be in future. The surround 2 can be made of thermoplastic urethane or elastomer or vulcanate (do not limit us to TPU, can be TPE or TPV or other plastic compound).

As shown in FIG. 5, supposed that a plane C extends through the top end and parallel with the plane XOY, then the plane C becomes a boundary plane of the surround 2 and the surround frame 1 during the injection molding process. Since the plane C is located lower than the lowest position of the annular convex section 20, the molten plastic material may flow from the plane C into the gap between surround frame 1 and the lower mold 4 rather than flow from the lowest position of the annular convex section 20 when the overflow of the molten plastic material occurs.

Second Embodiment

As shown in FIG. 2, the present embodiment provides a vibration module including a diaphragm 3, the surround 2 disclosed in the first embodiment and the surround frame 1 disclosed in the first embodiment. The outer edge of the diaphragm 3 is connected to the inner edge of the surround 2, and the surround frame 1 is secured to the top end of the basket 6.

Referring to FIGS. 2 and 3, alternatively, the surround 2 includes at least one first engaging portion 23, and the surround frame 1 includes at least one second engaging portion 15. The first engaging portion 23 engages with the second engaging portion 15, whereby the surround 2 cannot rotate with respect to the surround frame 1. The first engaging portion 23 can be a rectangular protrusion and disposed at the outer end of the surround 2. The second engaging portion 15 extends through the second annular boundary surface 101, the third annular boundary surface 120, the fourth annular boundary surface 121 and an outer annular surface of the surround frame 1. For example, the second engaging portion 15 is a rectangular through hole. The second engaging portion 15 is disposed at the outer end of the surround frame 1. The first engaging portion 23 engaged with the second engaging portion 15 may prevent rotation between the surround 2 and the surround frame 1.

As shown in FIG. 2, alternatively, the surround 2 includes a plurality of the first engaging portions 23, and the surround frame 1 includes a plurality of the second engaging portion 15. The first engaging portions 23 corresponds to the second engaging portions 15 respectively. For example, the surround 2 includes six first engaging portions 23, and the surround frame 1 includes six second engaging portions 15. The first engaging portions 23 and the second engaging portions 15 are separated by equal distance and arranged with respect to the Z axis. The plurality of the first engaging portions 23 and the second engaging portions 15 increases the reliability of the prevention for the relative rotation of the surround 2 and the surround frame 1.

Referring to FIGS. 3 and 4, alternatively, the surround 2 includes the first annular portion 21 having the protrusion 211. The surround frame 1 includes the first annular stepped structure 10. The first annular portion 21 is connected to the annular convex section 20. The first annular portion 21 engages with the first annular stepped structure 10. The cross section of the first annular portion 21 can be substantially trapezoid shape. The inner end of the first annular portion 21 is connected to the outer end of the annular convex section, and the outer end of the first annular portion 21 is connected to the inner end of the second annular portion 22.

Referring to FIGS. 3 and 4, the inner end of the first annular portion 21 locates near the Z axis, and the outer end of the first annular portion 21 locates away from the Z axis. The first annular portion 21 engages with the first annular stepped structure 10, and the first annular portion 21 has a portion filled into the first annular stepped structure 10. For example, the first annular portion 21 includes a bottom surface having the same area as the first annular boundary surface 100. The first annular portion 21 includes a lateral surface having the same area as the second annular boundary surface 101. The first annular portion 21 engages with the first annular stepped structure 10, whereby the first annular stepped structure 10 secures the first annular portion 21 to avoid the surround 2 moving along a direction perpendicular to the Z axis.

Referring to FIGS. 3 and 4, alternatively, the surround 2 includes the second annular portion 22, and the surround frame 1 includes the second annular stepped structure 12. The second annular portion 22 is connected to the first annular portion 21, and the second annular portion 22 engages with the second annular stepped structure 12. The second annular portion 22 has a cross section of trapezoid shape. The second annular portion 22 surrounds the first annular portion 21. The annular convex section 20, the first annular portion 21, and the second annular portion 22 are integrally formed. The second annular portion 22 engages with the second annular stepped structure 12, and the second annular portion 22 has a portion filled into the second annular stepped structure 12. Supposed that the cylindrical surface B extends through the outer end of the first annular portion 21 and parallel with the Z axis, then the portion of the surround 2 located between the cylindrical surface A and the cylindrical surface B is the first annular portion 21, and the portion outsides the cylindrical surface B is the second annular portion 22.

Referring to FIGS. 3 and 4, the second annular portion 22 includes a bottom surface having the same area as the third annular boundary surface 120. The second annular portion 22 includes a lateral surface having the same area as the forth annular boundary surface 121. The second annular portion 22 engages with the second annular stepped structure 12, whereby the second annular stepped structure 12 secures the second annular portion 22 to avoid the surround 2 moving along a direction perpendicular to the Z axis. The second annular stepped structure 12 and the first annular stepped structure 10 function together, thereby providing a better effect in preventing the surround 2 moving along the direction perpendicular to the Z axis in comparison with the conventional single stepped structure.

Third Embodiment

Figure 6:
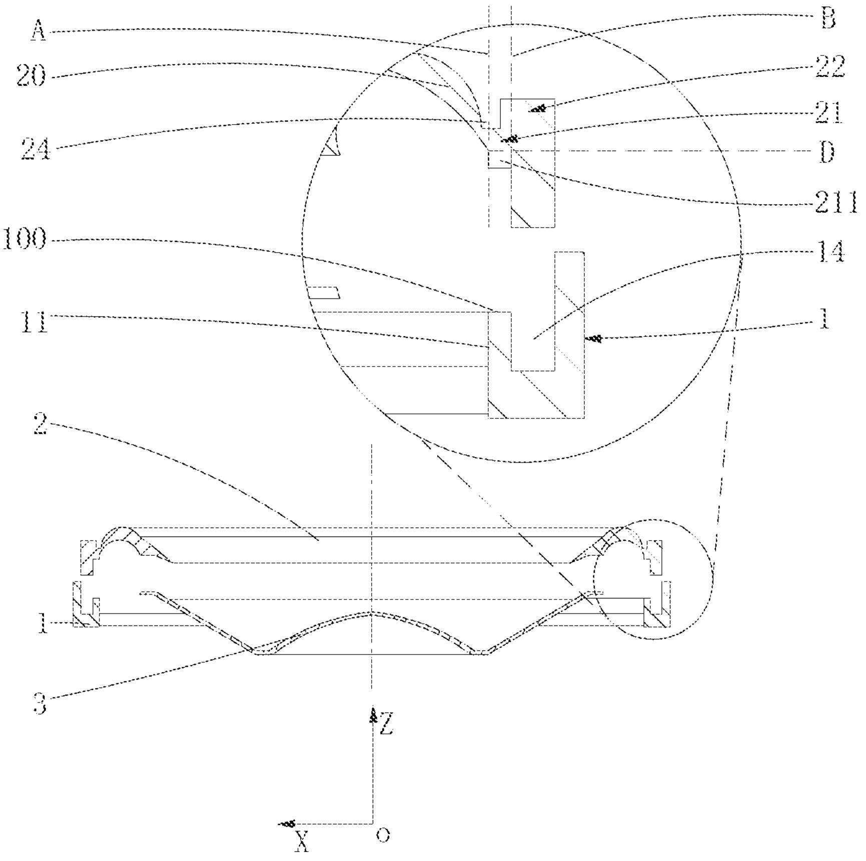
FIG. 6 is an exploded view of a cross section of a third embodiment of the vibration module of the disclosure and an enlarged view of a portion of the cross section.

As shown in FIG. 6, the present embodiment has a structure similar to the first embodiment, only the differences therebetween are described hereafter. In the present embodiment, the surround 2 includes the annular convex section 20, the first annular portion 21, and the second annular portion 22. The annular convex section 20 is connected to the diaphragm 3 to provide damping force for the vibration of the diaphragm 3. The first annular portion 21 is connected to the annular convex section 20, and the first annular portion 21 has the protrusion 221 opposite to the annular convex section 20. The second annular portion 22 is connected to the first annular portion 21 to serve as the rim of the surround 2. Supposed that the cylinder surface A extends through the bottom end and parallel with the Z axis, then the annular convex section 20 locates at the inner side of the cylinder surface A (at the left side of the cylinder surface A of FIG. 6). Supposed that a cylinder surface B extends through the outer end of the first annular portion 21 and parallel with the Z axis, then the portion of the surround 2 locates between the cylinder surface A and the cylinder surface B is the first annular portion 21. The portion of the surround 2 locates outsides the cylinder surface B is the second annular portion 22. Supposed that the plane D extends through the bottom end of the annular convex section 20 and parallel with plane XOY, then the protrusion 211 is the annular body of the first annular portion 21 located under the plane D. The second annular portion 22 shown in FIG. 6 increases the thickness of the edge of the surround 2, thereby increasing the space allowing the vibration of the surround 2 so as to increase the damping force for the diaphragm 3. Therefore, occurrence of acoustic break mode is thus reduced to obtain a better acoustic wave at high frequency. In other words, the second annular portion 22 has a thickness greater than that of the first annular portion 21. For example, the second annular portion 22 has the thickness 1.5 times or twice the thickness of the first annular portion 21.

The surround frame 1 includes the first annular boundary surface 100 and an annular groove 14 surrounding the central axis of the surround frame 1. The first annular boundary surface 100 extends from the top end of the inner annular surface 11 to the annular groove 14. The annular groove 14 and the surround frame 1 can be coaxial. The inner end of the first annular boundary surface 100 is connected to the inner annular surface 11, and the outer end of the first annular boundary surface 100 is connected to the inner end of the annular groove 14. The first annular boundary surface 100 extends from the top end of the inner annular surface 11 to the annular groove 14 along the direction away from the Z axis. The annular groove 14 increases contact area between the surround 2 and the surround frame 1, whereby the surround 2 is secured to the surround frame 1 more stably.

As shown in FIG. 6, alternatively, the annular groove 14 is formed by depressing from the first annular boundary surface 100 parallel with the plane XOY. The inner annular surface 11, the annular groove 14 and the first annular boundary surface 100 are integrally formed. The annular groove 14 is depressed from the first annular boundary surface 100 along the negative direction of the X axis, whereby the surround 2 on the annular groove 14 has a smaller angle with respect to the diaphragm 3 in comparison with the conventional structure that the annular groove 14 extends along a direction perpendicular to the Z axis, and therefore the surround 2 is secured to the surround frame 1 more stably and not easily to be pulled off the surround fame 1 by the diaphragm 3.

Figure 7:
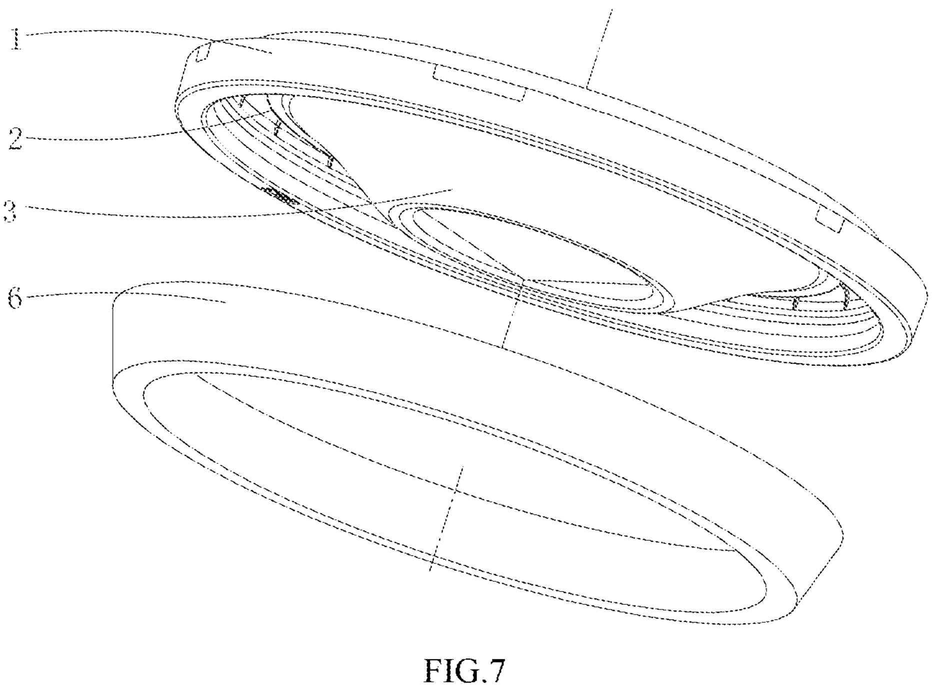
FIG. 7 is an exploded view of a surround frame and a basket of the third embodiment of the vibration module of the disclosure.

As shown in FIG. 7, the surround frame 1 is secured to the top end of the basket 6. For example, the surround frame 1 is secured to the basket 6 through soldering, welding or adhesive bonding. The basket 6 is made of rigid material, such as hard resin or plastic. The surround 2 is more easily assembled to the basket 6 with the surround frame 1. In an assembly process, the surround 2 is positioned with respect to the center of the diaphragm 3. As the surround 2 is flexible, the edge of the surround 2 cannot be effectively positioned due to wrinkles or shape. In the present embodiment, as the surround 2 is secured to the surround frame 1 which is rigid (made of hard resin) and secured to the basket 6, the surround 2 is more easily secured to the basket 6.

Fourth Embodiment

Figure 8:
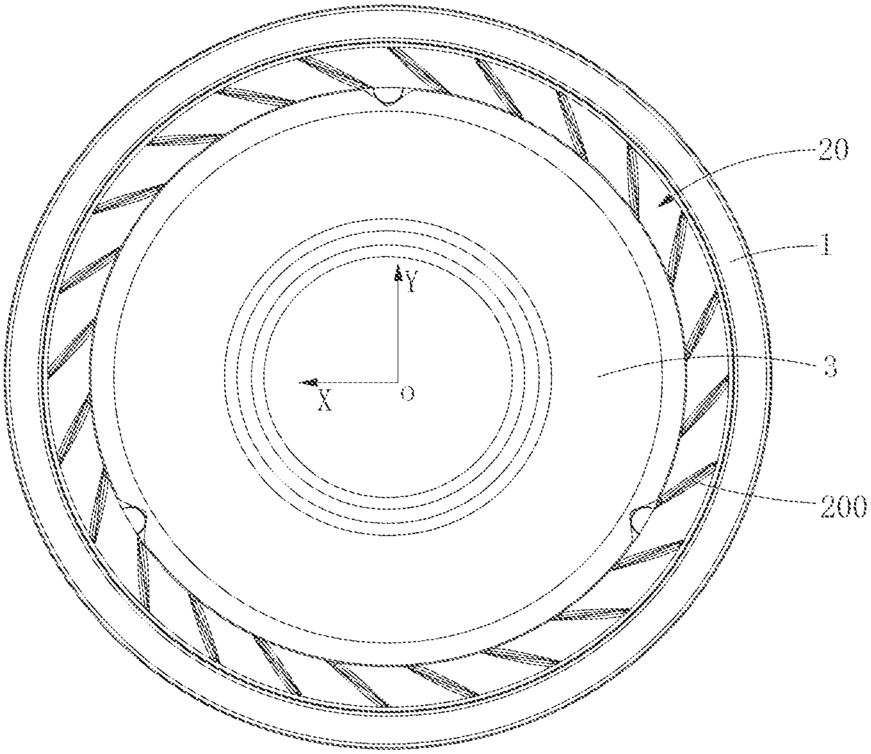
FIG. 8 is a back view of a fourth embodiment of a vibration module of the disclosure.

Referring to FIGS. 2 and 8, the present embodiment differs from the second embodiment in the surround 2. The present embodiment provides a vibration module including the surround 2. The surround 2 includes the annular convex section 20 and a plurality of ribs 200 disposed on the annular convex section 20. The ribs 200 are arranged to surround the central axis of the annular convex section 20. The ribs 200 are integrally formed with the annular convex section 20 and disposed on an inner surface thereof. The ribs 200 extend from the inner end to the outer end of the annular convex section 20 and surround the Z axis.

The ribs 200 increase a structural strength of the surround 2, and thus reduce amplitude of the surround 2 during vibration. The more the ribs 200 are disposed, the higher strength the surround 2 obtains.

Referring to FIGS. 2 and 8, alternatively, each of the ribs 200 extends slantly with respect to the radial direction of the surround 2, whereby the ribs 200 are arranged as a vortex structure, like a swirl pattern. The annular convex section 20 has a smooth outer surface on which the ribs 200 are arranged as the vortex structure, i.e. a radiation like shape around the X axis in view from the XOY plane. The ribs 200 have equally-distanced arrangement with respect to the Z axis, whereby the central axis of the diaphragm 3 is maintained coaxial with the Z axis during vibration.

Fifth Embodiment

Figure 9:
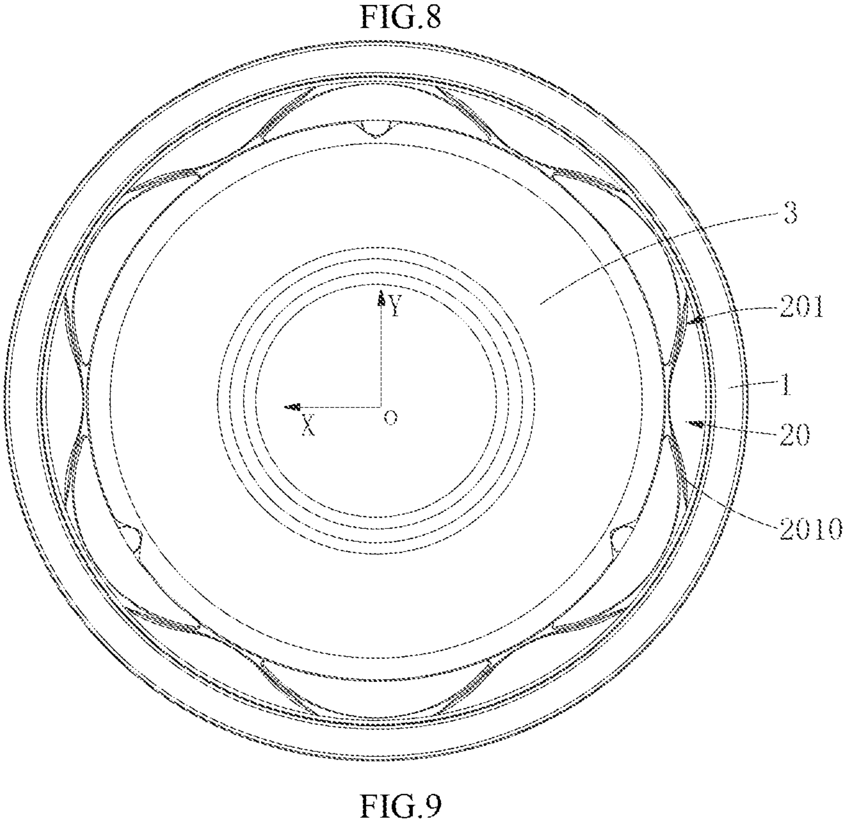
FIG. 9 is a back view of a fifth embodiment of a vibration module of the disclosure.

Referring to FIGS. 2 and 9, the present embodiment differs from the fourth embodiment in an annular rib 201. In the present embodiment, surround 2 includes an annular convex section 20 and the annular rib 201 disposed on the annular convex section 20. The annular rib 201 is arranged to surround the central axis of the annular convex section 20 and shapes as petals, whereby the deformation of the surround 2 is depressed. The annular rib 201 are disposed on the inner surface of the annular convex section 20 and integrally formed therewith. An inner end of the annular rib 201 is connected to the inner end of the annular convex section 20. The annular rib 201 is arranged around the central axis of the annular convex section 20 to control the deformation of the surround 2.

Referring to FIGS. 2 and 9, the annular rib 201 and the annular convex section 20 can be coaxial with the Z axis. When the surround 2 vibrates upwards (along the positive direction of the Z axis), deformation occurs at an outer region of the annular rib 201, the region away from the Z axis. When the surround 2 vibrates downwards (along the negative direction of the Z axis), deformation occurs at an inner region of the annular rib 201, the region near the Z axis.

Referring to FIGS. 2 and 9, alternatively, the annular rib 201 includes a plurality of sine wave portions 2010 connected to each other and surrounding the central axis of the annular convex section 20. The sine wave portion 2010 shapes as a sine wave. The sine wave portions 2010 are equally-distanced with respect to the Z axis, i.e. the sine wave portions 2010 surround the Z axis. The annular rib 201 has six sine wave portions 2010 in the present embodiment. The six sine wave portions 2010 are connected to form the annular rib 201 having a closed annular shape. The peak of each sine wave portion 2010 is connected to the outer end of the annular convex section 20, and the trough of each sine wave portion 2010 is connected to the inner end of the annular convex section 20.

Six Embodiment

Figure 10:
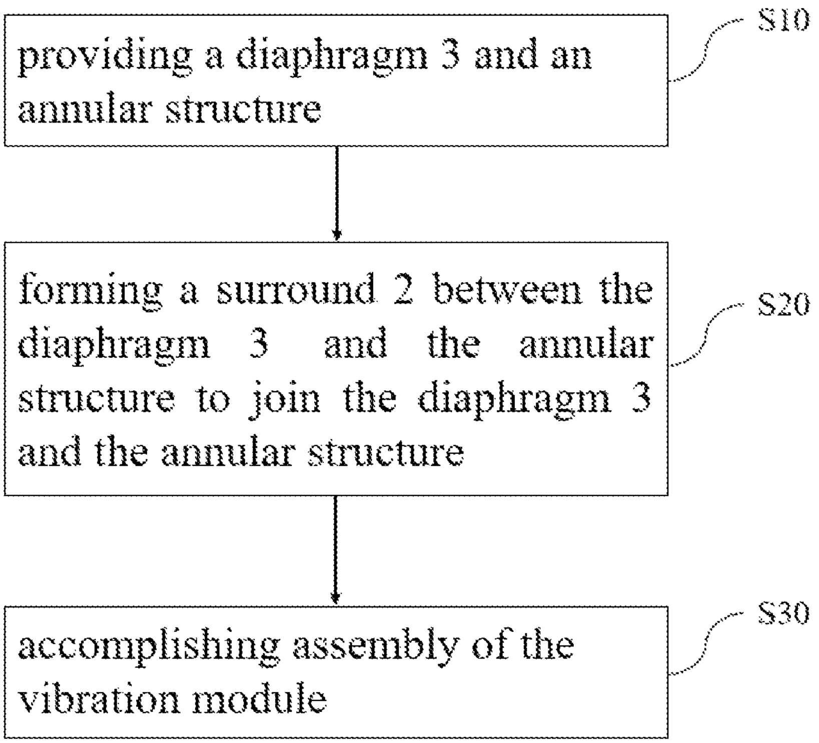
FIG. 10 is a flowchart of a manufacturing method of a sixth embodiment of a vibration module of the disclosure.

As shown in FIG. 10, the present embodiment provides a manufacturing method of the vibration module. The manufacturing method includes the following steps:

S10: providing a diaphragm 3 and an annular structure; the annular structure can be the surround frame 1.

S20: forming a surround 2 between the diaphragm 3 and the annular structure to join the diaphragm 3 and the annular structure; and S30: accomplishing assembly of the vibration module.

Alternatively, the surround 2 is formed through a plastic injection molding process.

Alternatively, the surround 2 includes the protrusion 211 disposed at the lower end of the annular convex section 20 of the surround 2.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A vibration module, comprising:

a diaphragm; and a surround comprising:

an annular convex section connected to the diaphragm and configured to damp the diaphragm during vibration thereof;

a first annular portion connected to the annular convex section and comprises a protrusion opposite to the annular convex section;

a second annular portion connected to the first annular portion and configured to serve as a rim of the surround;

a surround frame configured to support the surround, and comprising:

a first annular boundary surface disposed under the annular convex section and distanced from the annular convex section; and an inner annular surface disposed under the annular convex section and distanced from the annular convex section, wherein the first annular boundary surface intersects the inner annular surface, and wherein the surround frame further comprises a first annular stepped structure and a second stepped structure, wherein the first annular stepped structure comprises the first annular boundary surface and a second annular boundary surface extending upwards from an outer end of the first annular boundary surface, the first annular portion is engaged with the first annular stepped structure, the second stepped structure is connected to a top end of the second annular boundary surface, and the second annular portion is engaged with the second stepped structure, wherein an inner end of the first annular boundary surface is connected to a top end of the inner annular surface, and the first annular boundary surface extends outwards from the top end of the inner annular surface.

2. The vibration module as claimed in claim 1, wherein the second annular portion has a thickness greater than that of the first annular portion.

3. The vibration module as claimed in claim 1, wherein the surround further comprises a plurality of ribs disposed on the annular convex section and surrounding an axis thereof.

4. The vibration module as claimed in claim 3, wherein each of the plurality of ribs extends slantly with respect to a line radially intersecting the axis.

5. The vibration module as claimed in claim 1, wherein the surround further comprises an annular rib disposed on the annular convex section and surrounding an axis thereof.

6. The vibration module as claimed in claim 5, wherein the annular rib comprises a plurality of sine wave portions connected to each other to surround the axis.

7. The vibration module as claimed in claim 1, wherein the surround further comprises at least one first engaging portion, and the surround frame further comprises at least one second engaging portion engaged with the first engaging portion.

8. The vibration module as claimed in claim 1, wherein the surround further comprises a depressed groove formed between the first annular portion and the annular convex section.

9. A vibration module, comprising;

a surround comprising an annular convex section;

a surround frame configured to support the surround, and comprising:

a first annular boundary surface disposed under the annular convex section and distanced from the annular convex section; and an inner annular surface disposed under the annular convex section and distanced from the annular convex section, wherein the first annular boundary surface intersects the inner annular surface, wherein the surround comprises a first annular portion connected to the annular convex section, and a second annular portion connected to the first annular portion, the first annular portion comprises a protrusion opposite to the annular convex section, and the surround frame further comprises a first annular stepped structure and a second stepped structure, wherein the first annular stepped structure comprises the first annular boundary surface and a second annular boundary surface extending upwards from an outer end of the first annular boundary surface, the first annular portion is engaged with the first annular stepped structure, the second stepped structure is connected to a top end of the second annular boundary surface, and the second annular portion is engaged with the second stepped structure, wherein an inner end of the first annular boundary surface is connected to a top end of the inner annular surface, and the first annular boundary surface extends outwards from the top end of the inner annular surface.

10. The vibration module as claimed in claim 9, wherein the second stepped structure further comprises a third annular boundary surface, an inner end of the third annular boundary surface is connected to a top end of the second annular boundary surface, and the third annular boundary surface extends outwards from the top end of the second annular boundary surface.

11. The vibration module as claimed in claim 10, wherein the first annular boundary surface and the third annular boundary surface are parallel with a radial direction of the surround frame.

12. The vibration module as claimed in claim 10, wherein the second stepped structure further comprises a fourth annular boundary surface extends upwards from an outer end of the third annular boundary surface.

13. The vibration module as claimed in claim 9, further comprising an annular groove surrounding an axis of the surround frame, wherein the first annular boundary surface extends from the top end of the inner annular surface.

* * * * *